United States Patent [19]
Kitahara

[11] Patent Number: 5,920,436
[45] Date of Patent: Jul. 6, 1999

[54] LARGE-APERTURE LENS FOR LOW-ILLUMINANCE IMAGING

[75] Inventor: You Kitahara, Omiya, Japan

[73] Assignee: Fuji Photo Optical Co., Ltd., Saitama, Japan

[21] Appl. No.: 09/047,407

[22] Filed: Mar. 25, 1998

[30] Foreign Application Priority Data

Mar. 27, 1997 [JP] Japan ................................. 9-094646

[51] Int. Cl.$^6$ .............................. G02B 13/04; G02B 9/64
[52] U.S. Cl. ........................ 359/751; 359/749; 359/754; 359/755
[58] Field of Search .................................. 359/749, 750, 359/751, 752, 753, 754, 755

[56] References Cited

U.S. PATENT DOCUMENTS

| | | | |
|---|---|---|---|
| 3,992,085 | 11/1976 | Momiyama | 359/750 |
| 4,061,421 | 12/1977 | Nakagawa | 359/749 |
| 5,623,371 | 4/1997 | Hankawa | 359/749 |
| 5,796,529 | 8/1998 | Park | 359/751 |

*Primary Examiner*—Scott J. Sugarman
*Attorney, Agent, or Firm*—Ronald R. Snider; Snider & Chao, LLP

[57] ABSTRACT

In a large-aperture lens for low-illuminance imaging, a Gauss type lens configuration is employed, and a negative lens having a predetermined refracting power is inserted in front of the front-side cemented lens, whereby back focus is secured while compactness is attained, without using an aspherical lens. Successively disposed from the object side are a biconvex lens $L_1$, a positive meniscus lens $L_2$ having a convex surface directed onto the object side, a negative lens $L_3$ having a concave surface with a stronger curvature directed onto the image side, a positive meniscus lens $L_4$ (cemented with lens $L_5$) having a convex surface directed onto the object side, a negative meniscus lens $L_5$ having a concave surface directed onto the image side, a biconcave lens $L_6$ (cemented with lens $L_7$) having a surface with a stronger curvature directed onto the object side, biconvex lenses $L_7$ and $L_8$ each having a surface with a stronger curvature directed onto the image side, and a positive meniscus lens $L_9$ having a convex surface directed onto the object side. Assuming that the focal length of the whole system is f and the focal length of the third lens is $f_3$, the conditional expression of $0.35 < f/|f_3| < 0.56$ is satisfied.

4 Claims, 6 Drawing Sheets

LARGE-APERTURE LENS FOR LOW-ILLUMINANCE IMAGING

RELATED APPLICATIONS

This application claims the priority of Japanese Patent Application No. 9-94646 filed on Mar. 27, 1997, which is incorporated herein by reference.

BACKGROUND OF THE INVENTION

1. Field of the Invention

The present invention relates to a large-aperture lens for low-illuminance imaging and, in particular, to a large-aperture lens mounted in a small-sized camera for CCTV or the like used for low-illuminance imaging when cultured microorganisms and the like are being observed.

2. Description of the Prior Art

For example, in the case where cultured microorganisms and the like are being observed, imaging at a low illuminance is required. Various kinds of large-aperture lenses have been known as a lens mounted in a small-sized camera for CCTV or the like used for imaging in this case.

Namely, such a large-aperture lens has an angle of view of about 40 degrees, an F number of about 0.85, and a function for correcting chromatic aberration of light having a wavelength of 450 to 550 nm so that fluorescence can be favorably observed.

Meanwhile, such a large-aperture lens has recently been required to have a compact size and a long back focus.

In the conventional large-aperture lens, the whole length of the lens is long, i.e., about four to five times the focal length thereof, thus lacking compactness. On the other hand, its back focus is short, i.e., about 0.2 to 0.3 times the focal length thereof. Accordingly, in order to satisfy the requirements for securing compactness and back focus, it is necessary to use an aspherical lens, thereby increasing the cost of manufacture.

SUMMARY OF THE INVENTION

In view of such circumstances, it is an object of the present invention to provide a large-aperture lens for low illuminance imaging which can satisfy the requirements for securing compactness and back focus, without using an aspherical lens.

The present invention provides a large-aperture lens for low-illuminance imaging comprising, successively from an object side, a positive first lens group made of at least one sheet of lens, a second lens group made of at least one sheet of positive lens having a convex surface directed onto the object side, a third lens group made of one sheet of negative lens having a concave surface directed onto an image side, a fourth lens group made of a positive meniscus lens having a convex surface directed onto the object side and a negative meniscus lens having a concave surface directed onto the image side which are cemented together, a fifth lens group made of a negative lens having a stronger concave surface directed onto the object side and a positive lens having a stronger convex surface directed onto the image side which are cemented together, a positive sixth lens group made of at least one sheet of lens, and a seventh lens group made of one sheet of positive meniscus lens having a convex surface directed onto the object side; and satisfying the following conditional expression (1):

$$0.35 < f/|f_3| < 0.56 \quad (1)$$

wherein f is a focal length of the whole system; and $f_3$ is a focal length of the third lens group.

Here, each of the first and sixth lens groups may include a plurality of lens sheets.

In the configuration mentioned above, the third lens group is made as a negative lens, so as to weaken the refracting power of the front group as a whole, thereby securing back focus.

Also, part of the refracting power of the negative lens of the fourth lens group is borne by the third lens group, so as to suppress sagittal flare. Further, the sagittal flare is corrected by the sixth lens group.

The above-mentioned conditional expression (1) is defined so as to make coma favorable, secure back focus, and reduce Petzval sum. Above the upper limit of this conditional expression, coma deteriorates. Below the lower limit, back focus decreases while Petzval sum increases.

Preferably, the above-mentioned larger-aperture lens for low-illuminance imaging further satisfies the following conditional expressions (2) to (5):

$$0.40 < (d_{G4} + d_{G5})/f < 0.55 \quad (2)$$

$$1.6 < f/f_{(5p+6)} < 2.5 \quad (3)$$

$$1.8 < n_{(5p, 6, 7)} \quad (4)$$

$$(v_3 + v_{5n})/2 < 27 \quad (5)$$

wherein $f_{(5p+6)}$ is a composite focal length of the positive lens of the fifth lens group and the sixth lens group;

$d_{G4}$ and $d_{G5}$ are respective center thickness values of the fourth and fifth lens groups;

$n_{(5p, 6, 7)}$ is an average value of refractive indexes of the positive lens in the fifth lens group and all the lenses of the sixth and seventh lens groups; and $v_3$ and $v_{5n}$ are respective Abbe numbers of the third lens group and the negative lens in the fifth lens group.

The above-mentioned conditional expression (2) is defined for ameliorating various kinds of aberration such as spherical aberration, axial chromatic aberration, and chromatic aberration in magnification. Above the upper limit of this conditional expression, spherical aberration, axial chromatic aberration, and chromatic aberration in magnification may deteriorate. Below the lower limit, astigmatism, coma, distortion, and chromatic aberration in magnification may deteriorate.

The above-mentioned conditional expression (3) is defined for ameliorating spherical aberration and image surface curvature, and suppressing sagittal flare. Above the upper limit of this conditional expression, spherical aberration and image surface curvature may deteriorate. Below the lower limit, sagittal flare may increase.

The above-mentioned conditional expression (4) is defined so as to secure back focus and reduce Petzval sum. Below the lower limit of this conditional expression, back focus may decrease, while Petzval sum may increase.

The above-mentioned conditional expression (5) is defined so as to ameliorate axial chromatic aberration and chromatic aberration in magnification. Above the upper limit of this conditional expression, axial chromatic aberration and chromatic aberration in magnification may deteriorate.

Preferably, each lens surface of all the lenses constituting each lens group is formed by a spherical surface.

The present invention also provides a large-aperture lens for low-illuminance imaging comprising, successively from an object side, a positive first lens group made of at least one sheet of lens, a second lens group made of at least one sheet of positive lens having a convex surface directed onto the object side, a third lens group made of one sheet of negative lens having a concave surface directed onto an image side, a fourth lens group made of a positive meniscus lens having a convex surface directed onto the object side and a negative meniscus lens having a concave surface directed onto the image side which are cemented together, a fifth lens group made of a negative lens having a stronger concave surface directed onto the object side and a positive lens having a stronger convex surface directed onto the image side which are cemented together, a positive sixth lens group made of at least one sheet of lens, and a seventh lens group made of one sheet of positive meniscus lens having a convex surface directed onto the object side; and satisfying the above-mentioned conditional expressions (1), (2), and (4).

DESCRIPTION OF THE PREFERRED EMBODIMENTS

In the following, with reference to the accompanying drawings, the large-aperture lens for low-illuminance imaging in accordance with the present invention will be explained in terms of Examples 1 to 3.

EXAMPLE 1

Figure 1:
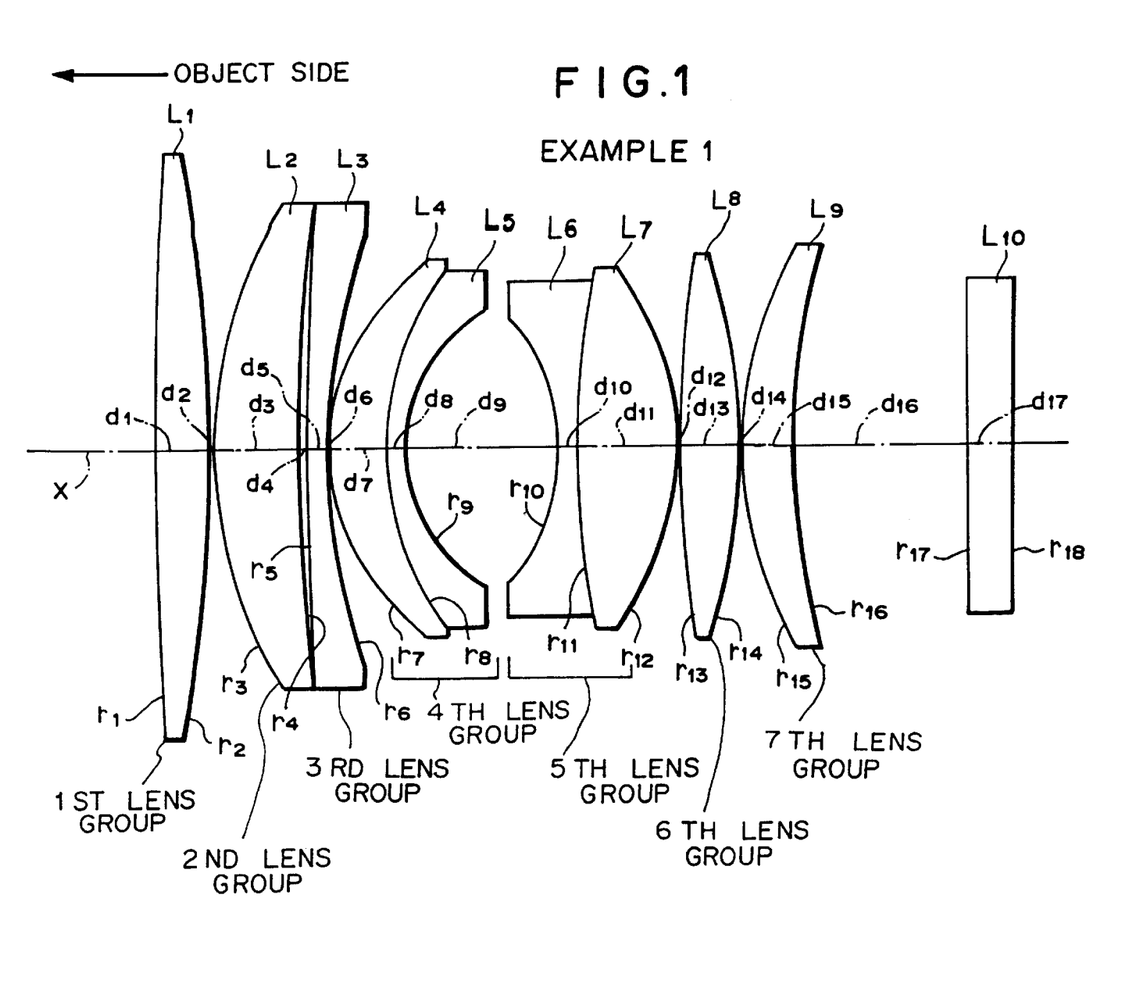
FIG. 1 is a schematic view showing a basic lens configuration in accordance with Example 1.

The large-aperture lens for low-illuminance imaging in accordance with Example 1 shown in FIG. 1 comprises, successively from the object side, a single sheet of biconvex lens $L_1$ (first lens group), a positive meniscus lens $L_2$ having a convex surface directed onto the object side (second lens group), a negative lens $L_3$ having a concave surface with a stronger refracting power directed onto the image side (third lens group), a positive meniscus lens $L_4$ having a convex surface directed onto the object side (fourth lens group), a negative meniscus lens $L_5$ having a concave surface directed onto the image side (fourth lens group), a biconcave lens $L_6$ having a concave surface with a stronger refracting power directed onto the object side (fifth lens group), a biconvex lens $L_7$ having a convex surface with a stronger refracting power directed onto the image side (fifth lens group), a biconvex lens $L_8$ (sixth lens group), and a positive meniscus lens $L_9$ having a convex surface directed onto the object side (seventh lens group).

The two lenses $L_4$ and $L_5$ and the two lenses $L_6$ and $L_7$ are respectively cemented together, thereby constituting a Gauss type lens configuration by which the whole lens system can be made compact.

A cover glass $L_{10}$ of CCD is disposed downstream the lens $L_9$.

Table 1 (follows) shows values of radius of curvature r (mm) of each lens surface, center thickness of each lens and air gap between neighboring lenses (hereinafter collectively referred to as axial spacing) d (mm), and refractive index N and Abbe number ν of each lens at d-line in Example 1.

Numbers in the table successively increase from the object side.

The lower part of Table 1 shows values of focal length F, F number, angle of view 2ω, conjugate length, and back focus in the whole lens system of Example 1. Also, as shown in Table 4, values of $f/|f_3|$, $(d_{G4}+d_{G5})/f$, $f/f_{(5p+6)}$, $n_{(5p, 6, 7)}$, and $(v_{3}+v_{5n})/2$ in Example 1 satisfy the above-mentioned conditional expressions (1) to (5).

EXAMPLE 2

Figure 2:
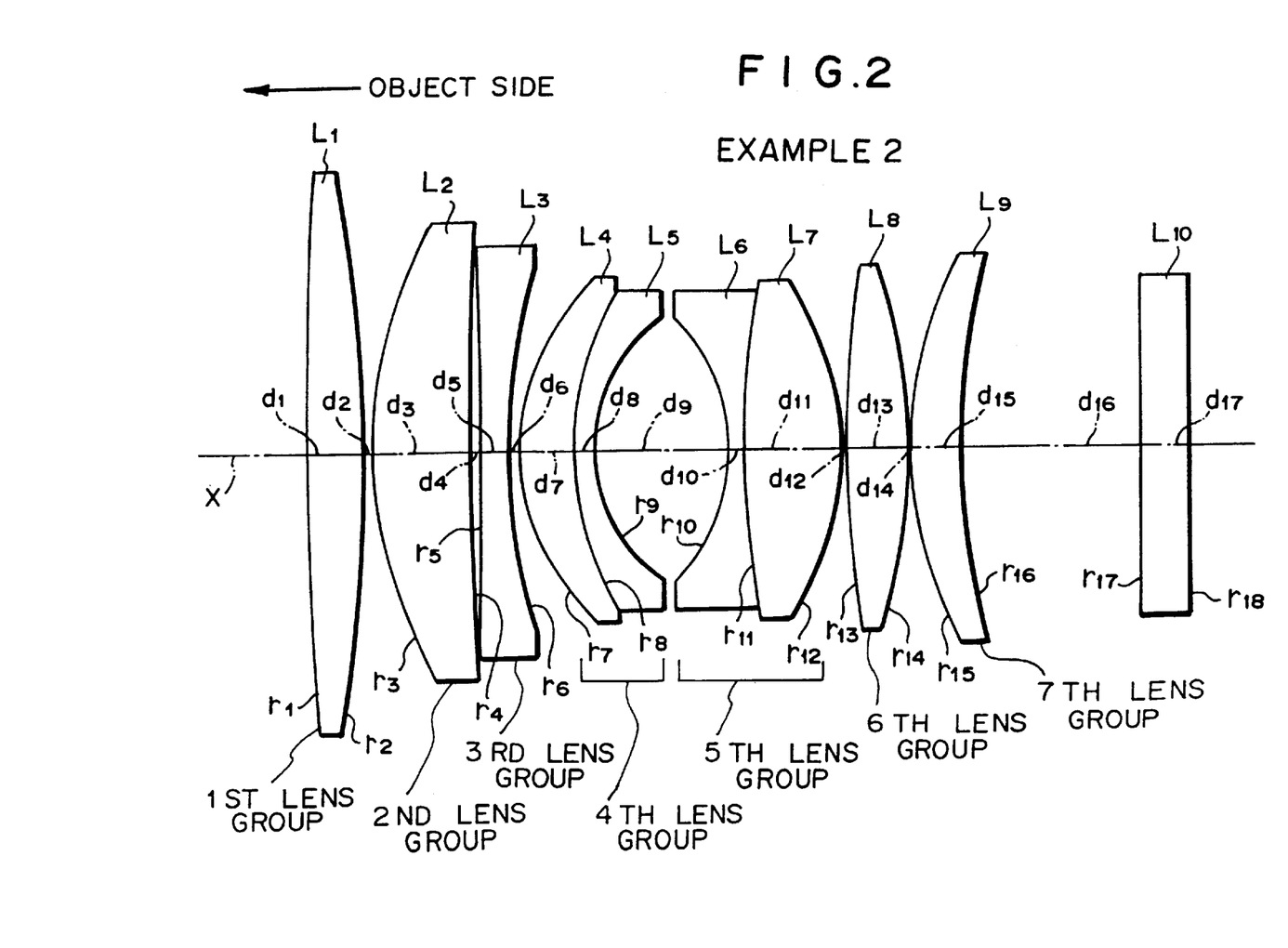
FIG. 2 is a schematic view showing a basic lens configuration in accordance with Example 2.

The large-aperture lens for low-illuminance imaging in accordance with Example 2 shown in FIG. 2 has a configuration substantially the same as that of the large-aperture lens for low-illuminance imaging in accordance with Example 1.

Table 2 (follows) shows values of radius of curvature r (mm) of each lens surface, axial spacing d (mm), and refractive index N and Abbe number ν of each lens at d-line in Example 2.

Numbers in the table successively increase from the object side.

The lower part of Table 2 shows values of focal length F, F number, angle of view 2ω, conjugate length, and back focus in the whole lens system of Example 2. Also, as shown in Table 4, values of $f/|f_3|$, $(d_{G4}+d_{G5})/f$, $f/f_{(5p+6)}$, $n_{(5p, 6, 7)}$, and $(v_{3}+v_{5n})/2$ in Example 2 satisfy the above-mentioned conditional expressions (1) to (5).

EXAMPLE 3

Figure 3:
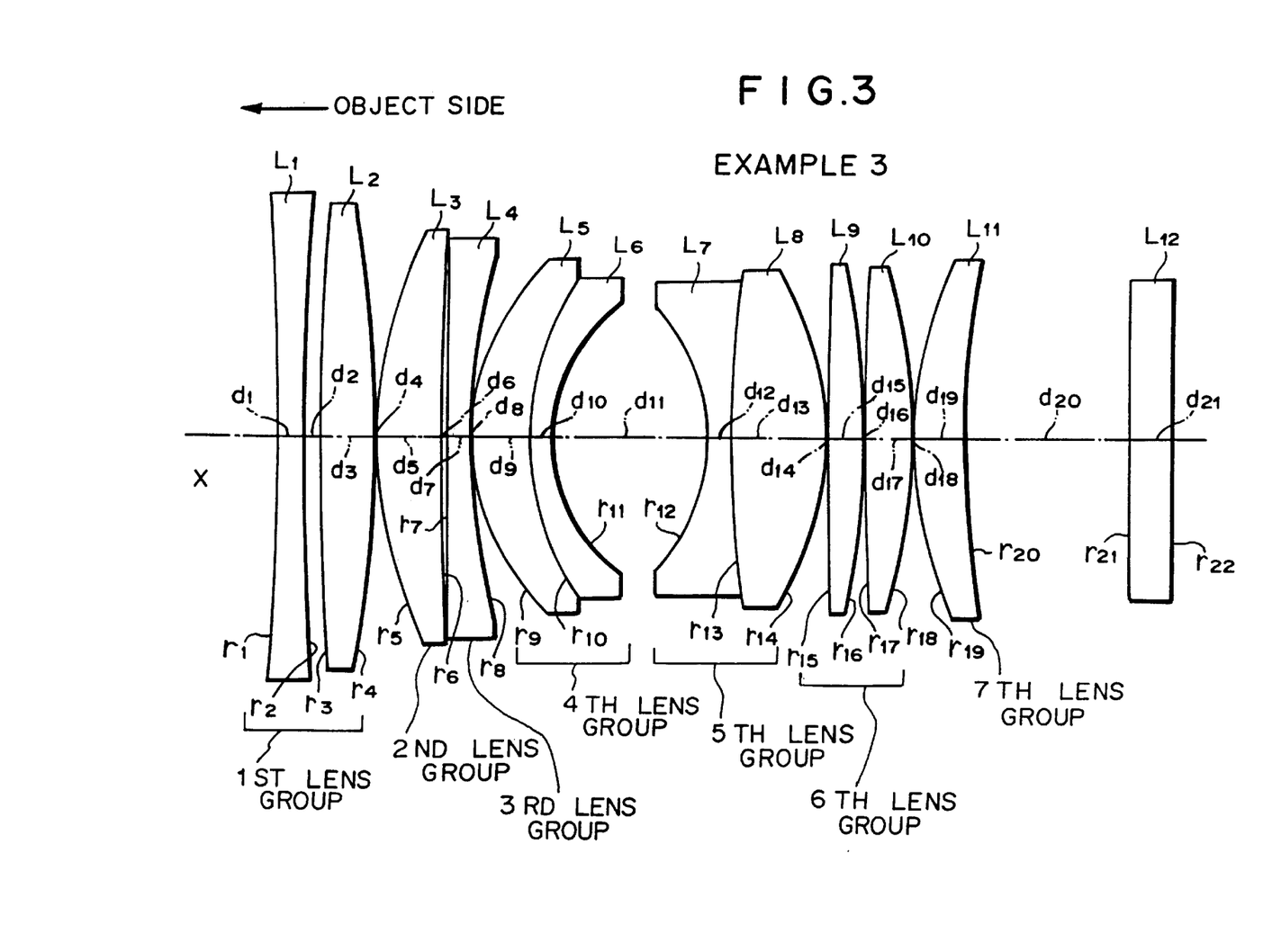
FIG. 3 is a schematic view showing a basic lens configuration in accordance with Example 3.

The large-aperture lens for low-illuminance imaging in accordance with Example 3 shown in FIG. 3 has a configuration substantially the same as that of the large-aperture lens for low-illuminance imaging in accordance with Example 1 except that the first lens group is constituted by a biconcave lens $L_1$ and a biconvex lens $L_2$ and that the sixth lens group is constituted by two biconvex lenses $L_9$ and $L_{10}$.

Table 3 (follows) shows values of radius of curvature r (mm) of each lens surface, axial spacing d (mm), and refractive index N and Abbe number ν of each lens at d-line in Example 3.

Numbers in the table successively increase from the object side.

The lower part of Table 3 shows values of focal length F, F number, angle of view 2ω, conjugate length, and back focus in the whole lens system of Example 3. Also, as shown in Table 4 (follows), values of $f/|f_3|$, $(d_{G4}+d_{G5})/f$, $f/f_{(5p+6)}$, $n_{(5p, 6, 7)}$, and $(v_{3}+v_{5n})/2$ in example 3 satisfy the above-mentioned conditional expressions (1) to (5)

Figure 4A:
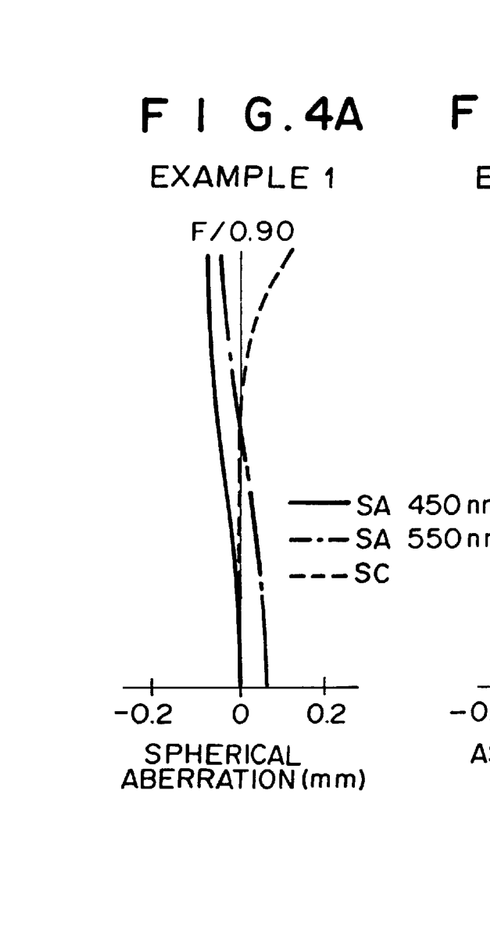
FIGS. 4A to 4D are aberration charts of the large-aperture lens for low-illuminance imaging in accordance with Example 1.
Figures 4B, 4C:
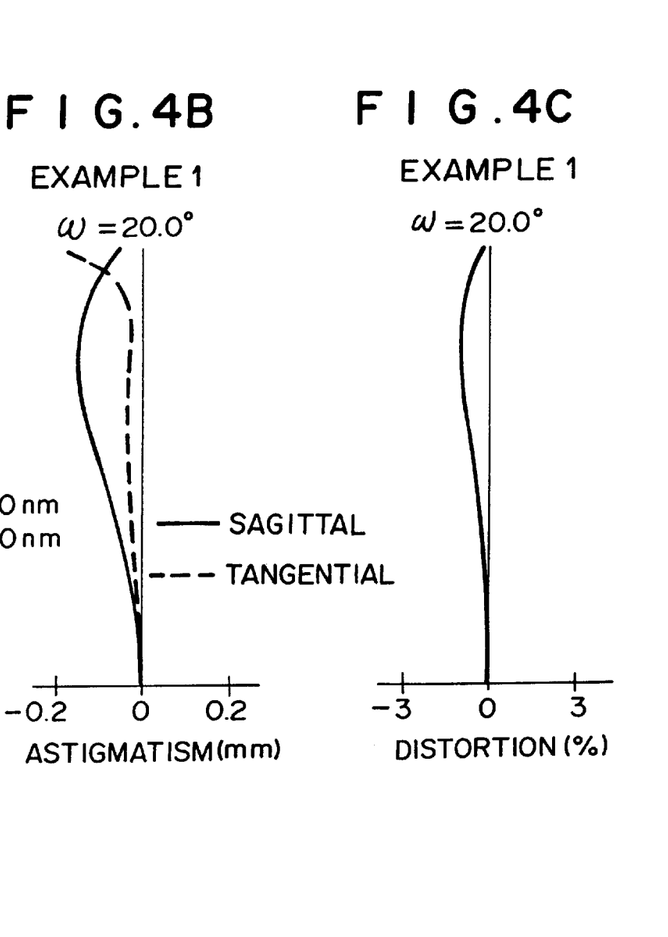
Figure 4D:
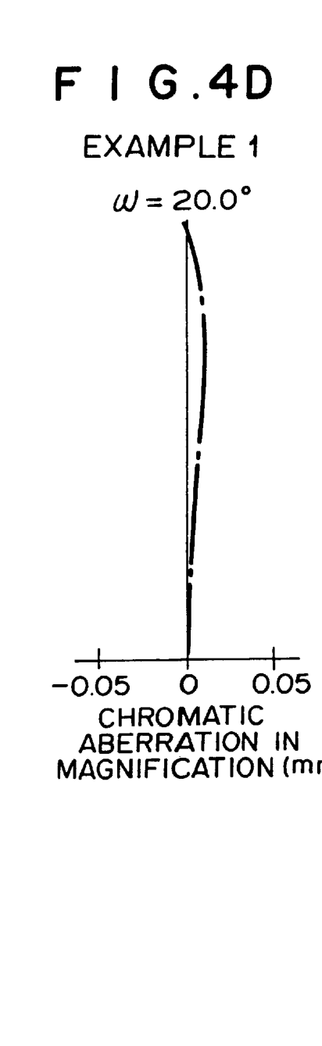
Figures 5A, 5B, 5C:
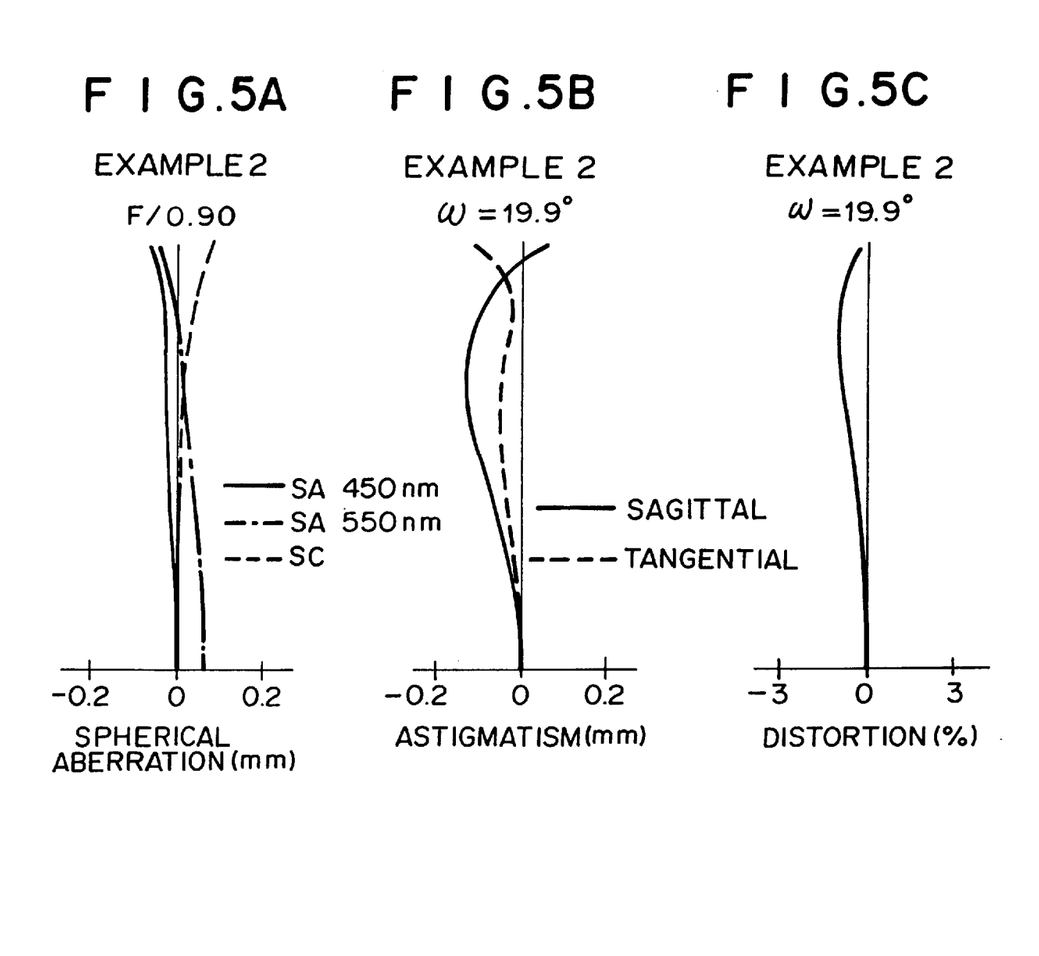
FIGS. 5A to 5D are aberration charts of the large-aperture lens for low-illuminance imaging in accordance with Example 2.
Figure 5D:
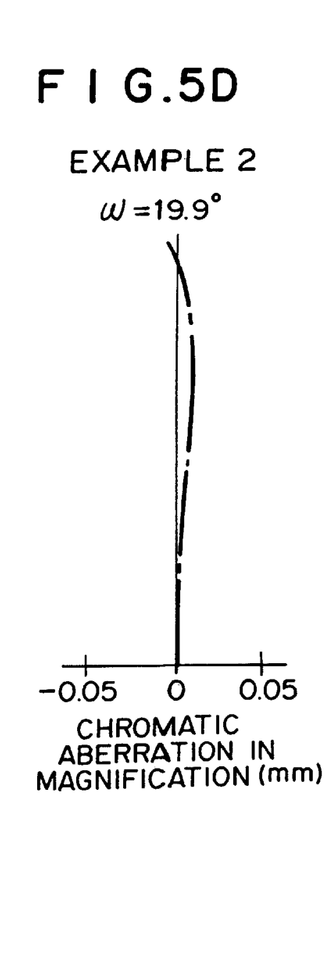
Figures 6A, 6B, 6C:
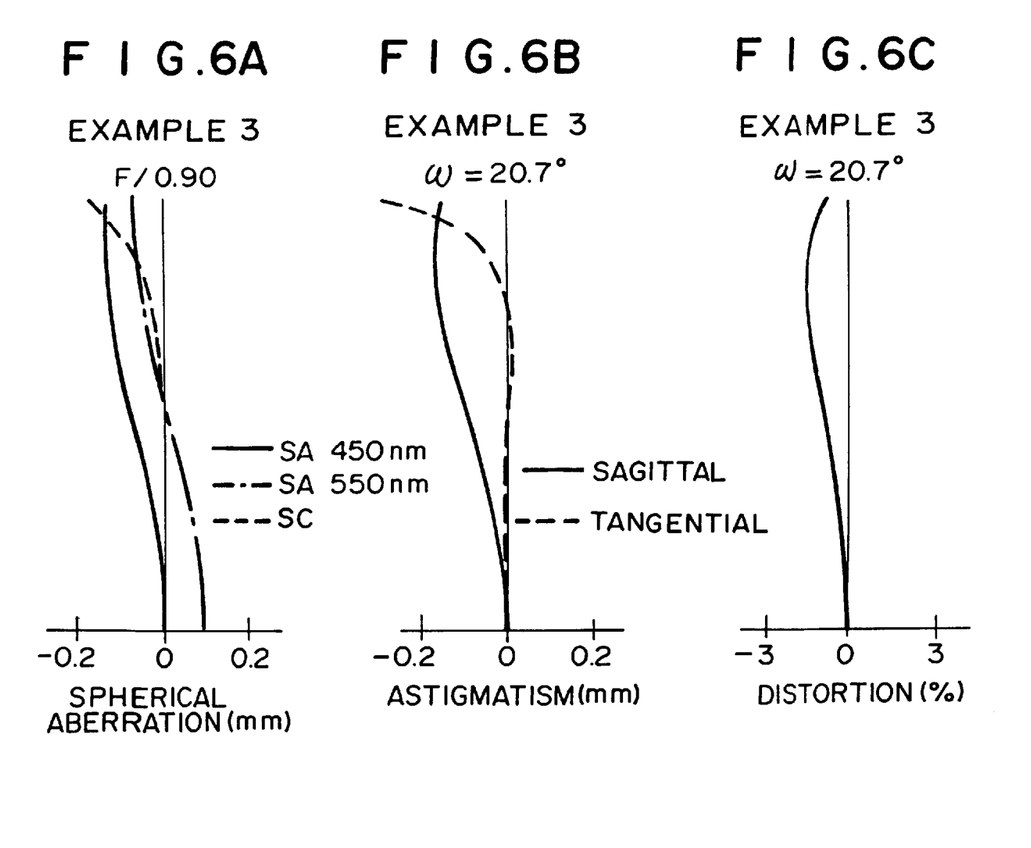
FIGS. 6A to 6D are aberration charts of the large-aperture lens for low-illuminance imaging in accordance with Example 3.
Figure 6D:
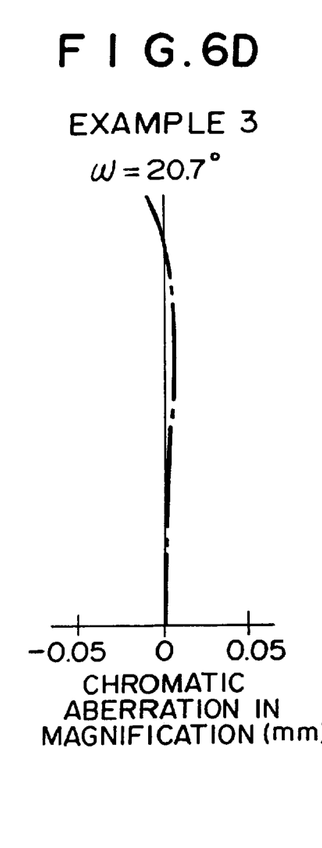

FIGS. 4 (4A to 4D) to 6 (6A to 6D) are aberration charts showing various kinds of aberration (spherical aberration, astigmatism, distortion, and chromatic aberration in magnification) in Examples 1 to 3, respectively. Each spherical aberration chart also indicates sine condition (SC). Each astigmatism chart shows respective amounts of aberration concerning sagittal and tangential image surfaces.

As can be seen from these aberration charts, the large-aperture lens for low-illuminance imaging in accordance with each Example can make various aberrations favorable while having a simple configuration.

The large-aperture lens in accordance with the present invention should not be restricted to the foregoing Examples. For instance, the forms of lenses may be chosen appropriately.

In the large-aperture lens for low-illuminance imaging in accordance with the present invention, since a Gauss type lens configuration is employed, the whole lens system can be made compact. Also, as a negative lens having a predetermined range of refracting power is inserted in front of the front-side cemented lens, back focus is secured.

Further, since aberration can be made favorable while these requirements are satisfied without using an aspherical lens, the tasks conventionally required for the large-aperture lens for low-illuminance imaging can be achieved all at once.

TABLE 1

| Surface | r | d | N | ν |
|---|---|---|---|---|
| 1 | 268.23 | 3.20 | 1.78500 | 43.7 |
| 2 | −95.04 | 0.30 | | |
| 3 | 26.75 | 4.90 | 1.83500 | 42.7 |
| 4 | 103.28 | 0.46 | | |
| 5 | 220.97 | 1.25 | 1.78472 | 25.7 |
| 6 | 41.65 | 0.10 | | |
| 7 | 13.59 | 3.25 | 1.83500 | 42.7 |
| 8 | 18.12 | 1.00 | 1.64769 | 33.9 |
| 9 | 9.29 | 9.00 | | |
| 10 | −11.37 | 1.00 | 1.84666 | 23.9 |
| 11 | 53.35 | 5.85 | 1.88300 | 40.9 |
| 12 | −17.18 | 0.20 | | |
| 13 | 70.44 | 3.55 | 1.88300 | 40.9 |
| 14 | −35.35 | 0.10 | | |
| 15 | 23.33 | 2.90 | 1.83500 | 42.7 |
| 16 | 44.83 | 10.00 | | |
| 17 | ∞ | 2.65 | 1.51633 | 64.1 |
| 18 | ∞ | | | |

F = 24.0
Fno = 1:0.85
2ω = 40.0°
conjugate length = 300 mm
back focus = focal length × 0.419 (10.1 mm)

TABLE 2

| Surface | r | d | N | ν |
|---|---|---|---|---|
| 1 | 241.35 | 3.20 | 1.81035 | 41.5 |
| 2 | −88.84 | 0.47 | | |
| 3 | 26.71 | 5.43 | 1.85142 | 41.2 |
| 4 | 155.19 | 0.55 | | |
| 5 | −3751.43 | 1.62 | 1.79049 | 25.8 |
| 6 | 37.25 | 0.65 | | |
| 7 | 13.43 | 3.00 | 1.85507 | 40.8 |
| 8 | 18.18 | 1.00 | 1.66761 | 32.5 |
| 9 | 9.31 | 7.49 | | |
| 10 | −11.41 | 1.00 | 1.84666 | 23.9 |
| 11 | 52.74 | 5.50 | 1.88300 | 40.9 |
| 12 | −17.47 | 0.28 | | |
| 13 | 68.25 | 3.55 | 1.88300 | 40.9 |
| 14 | −33.79 | 0.10 | | |
| 15 | 23.23 | 2.81 | 1.84180 | 42.1 |
| 16 | 45.40 | 10.00 | | |
| 17 | ∞ | 2.65 | 1.51633 | 64.1 |
| 18 | ∞ | | | |

F = 23.9
Fno = 1:0.85
2ω = 39.8°
conjugate length = 300 mm
back focus = focal length × 0.419 (10.0 mm)

TABLE 3

| Surface | r | d | N | ν |
|---|---|---|---|---|
| 1 | −213.50 | 1.52 | 1.71700 | 47.9 |
| 2 | 190.81 | 1.09 | | |
| 3 | 215.48 | 3.43 | 1.88300 | 40.9 |
| 4 | −74.87 | 0.13 | | |
| 5 | 30.52 | 3.73 | 1.88300 | 40.9 |
| 6 | 266.63 | 0.25 | | |
| 7 | 1153.92 | 1.50 | 1.74000 | 28.2 |
| 8 | 44.59 | 0.10 | | |
| 9 | 15.11 | 3.50 | 1.88300 | 40.9 |
| 10 | 18.29 | 1.45 | 1.68893 | 31.1 |
| 11 | 10.62 | 9.23 | | |
| 12 | −11.92 | 1.50 | 1.84666 | 23.9 |
| 13 | 73.06 | 5.85 | 1.83500 | 42.7 |
| 14 | −19.68 | 0.10 | | |
| 15 | 529.52 | 2.11 | 1.83500 | 42.7 |
| 16 | −55.97 | 0.10 | | |
| 17 | 246.07 | 2.80 | 1.80235 | 46.7 |
| 18 | −37.60 | 0.10 | | |
| 19 | 25.84 | 3.03 | 1.80235 | 46.7 |
| 20 | 61.04 | 10.00 | | |
| 21 | ∞ | 2.65 | 1.51633 | 64.1 |
| 22 | ∞ | | | |

F = 23.9
Fno = 1:0.85
2ω = 41.4°
conjugate length = 300 mm
back focus = focal length × 0.466 (11.1 mm)

TABLE 4

| | Example 1 | Example 2 | Example 3 |
|---|---|---|---|
| $f/|f_3|$ | 0.382 | 0.535 | 0.395 |
| $(d_{G4} + d_{G5})/f$ | 0.461 | 0.439 | 0.515 |
| $f/f_{(Sp+6)}$ | 2.209 | 2.115 | 1.929 |
| $<<(n_{(Sp,6,7)})>>$ | 1.867 | 1.869 | 1.818 |
| $(\nu_3 + \nu_{Sn})/2$ | 24.8 | 24.8 | 26.0 |

What is claimed is:

1. A large-aperture lens for low-illuminance imaging comprising, successively from an object side, a positive first lens group made of at least one sheet of lens, a second lens group made of at least one sheet of positive lens having a convex surface directed onto the object side, a third lens group made of one sheet of negative lens having a concave surface directed onto an image side, a fourth lens group made of a positive meniscus lens having a convex surface directed onto the object side and a negative meniscus lens having a concave surface directed onto the image side which are cemented together, a fifth lens group made of a negative lens having a stronger concave surface directed onto the object side and a positive lens having a stronger convex surface directed onto the image side which are cemented together, a positive sixth lens group made of at least one sheet of lens, and a seventh lens group made of one sheet of positive meniscus lens having a convex surface directed onto the object side; said larger-aperture lens satisfying the following conditional expression (1):

$$0.35 < f/|f_3| < 0.56 \tag{1}$$

wherein f is a focal length of the whole system; and $f_3$ is a focal length of the third lens group.

2. A large-aperture lens for low-illuminance imaging according to claim 1, further satisfying the following conditional expressions (2) to (5):

$$0.40 < (d_{G4} + d_{G5})/f < 0.55 \tag{2}$$

$$1.6 < f/f_{(5p+6)} < 2.5 \quad (3)$$

$$1.8 < n_{(5p, 6, 7)} \quad (4)$$

$$(\nu_3 + \nu_{5n})/2 < 27 \quad (5)$$

wherein $f_{(5p+6)}$ is a composite focal length of the positive lens of the fifth lens group and the sixth lens group;

$d_{G4}$ and $d_{G5}$ are respective center thickness values of the fourth and fifth lens groups;

$n_{(5p, 6, 7)}$ is an average value of refractive indexes of the positive lens in the fifth lens group and all the lenses of the sixth and seventh lens groups; and $\nu_3$ and $\nu_{5n}$ are respective Abbe numbers of the third lens group and the negative lens in the fifth lens group.

3. A large-aperture lens for low-illuminance imaging according to claim 1, wherein each lens surface of all the lenses constituting each lens group is formed by a spherical surface.

4. A large-aperture lens for low-illuminance imaging comprising, successively from an object side, a positive first lens group made of at least one sheet of lens, a second lens group made of at least one sheet of positive lens having a convex surface directed onto the object side, a third lens group made of one sheet of negative lens having a concave surface directed onto an image side, a fourth lens group made of a positive meniscus lens having a convex surface directed onto the object side and a negative meniscus lens having a concave surface directed onto the image side which are cemented together, a fifth lens group made of a negative lens having a stronger concave surface directed onto the object side and a positive lens having a stronger convex surface directed onto the image side which are cemented together, a positive sixth lens group made of at least one sheet of lens, and a seventh lens group made of one sheet of positive meniscus lens having a convex surface directed onto the object side; said larger-aperture lens satisfying the following conditional expressions (6) to (8):

$$0.35 < f/|f_3| < 0.56 \quad (6)$$

$$0.40 < (d_{G4} + d_{G5})/f < 0.55 \quad (7)$$

$$1.8 < n_{(5p, 6, 7)} \quad (8)$$

wherein f is a focal length of the whole system;

$f_3$ is a focal length of the third lens group;

$d_{G4}$ and $d_{G5}$ are respective center thickness values of the fourth and fifth lens groups; and $n_{(5p, 6, 7)}$ is an average value of refractive indexes of the positive lens in the fifth lens group and all the lenses of the sixth and seventh lens groups.

\* \* \* \* \*